(12) United States Patent
Johnston

(10) Patent No.: US 8,511,341 B2
(45) Date of Patent: Aug. 20, 2013

(54) MARINE FUEL BACKFLOW PREVENTER AND OVER-FILL ALARM SYSTEM

(76) Inventor: Gary E. Johnston, Lighthouse Point, FL (US)

( * ) Notice: Subject to any disclaimer, the term of this patent is extended or adjusted under 35 U.S.C. 154(b) by 331 days.

(21) Appl. No.: 13/038,448

(22) Filed: Mar. 2, 2011

(65) Prior Publication Data

US 2012/0222755 A1 Sep. 6, 2012

(51) Int. Cl.
*B63B 25/08* (2006.01)
*B65D 47/02* (2006.01)
*B65D 49/00* (2006.01)
*B67C 3/26* (2006.01)

(52) U.S. Cl.
USPC ........ 137/575; 137/558; 137/587; 137/590.5; 137/592; 114/74 R; 114/289; 220/86.2

(58) Field of Classification Search
USPC .............. 137/575, 587, 588, 590, 590.5, 592, 137/899.2, 558; 114/74 R, 289; 141/62; 220/86.2; 60/39.281
See application file for complete search history.

(56) References Cited

U.S. PATENT DOCUMENTS

| | | | |
|---|---|---|---|
| 3,187,935 A | 6/1965 | Lense | |
| 4,082,125 A | 4/1978 | Wilson et al. | |
| 4,724,861 A | 2/1988 | Covert et al. | |
| 4,802,514 A | 2/1989 | Morse | |
| 5,322,099 A | 6/1994 | Langlois | |
| 5,515,891 A | 5/1996 | Langlois | |
| 5,894,809 A * | 4/1999 | Grigaitis et al. | 114/343 |
| 5,950,688 A | 9/1999 | Langlois | |
| 5,975,154 A | 11/1999 | Bennett | |
| 6,167,911 B1 | 1/2001 | Diamond | |
| 6,929,039 B2 | 8/2005 | Vaitses | |
| 7,380,542 B1 * | 6/2008 | Herrington | 123/509 |
| 2010/0065137 A1 | 3/2010 | Armellino | |

* cited by examiner

*Primary Examiner* — Craig Schneider
*Assistant Examiner* — Atif Chaudry
(74) *Attorney, Agent, or Firm* — Mark D. Bowen; Malin Haley DiMaggio & Bowen, P.A.

(57) ABSTRACT

A marine fuel backflow preventer and overfill alarm for use with marine vessels includes a housing provided for in-line installation in the fuel fill inlet line and directs fuel entering the fuel filling inlet generally directly to a fuel filling outlet such that the fuel passes freely through the back flow preventer while being directed to the vessel fuel tank. The housing further functions as a reservoir for containing fuel which has accumulated therein due to over-filling and/or that has been carried into the housing via the fuel tank vent line. By providing a fuel containing reservoir disposed in-line the present invention thus functions to prevent unintended fuel spillage into the environment. The back flow preventer further includes an electro-mechanical float switch that automatically activates an alarm upon sensing the presence of fuel within the housing. The alarm provides the fuel filling attendant a prompt warning that an overflow condition is being experienced such that the flow of fuel may be terminated prior to spillage into the environment.

6 Claims, 5 Drawing Sheets

MARINE FUEL BACKFLOW PREVENTER AND OVER-FILL ALARM SYSTEM

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

This invention relates generally to the field of marine fuel systems and more particularly to marine fuel systems comprising a backflow prevention and overfill alarm system.

2. Description of Related Art

Fueling of marine vessels is a frequent and necessary task for all vessel operators. Marine vessels typically have an internally mounted fuel tank for storing liquid fuel, and supplying fuel to one or more internal combustion engines for propulsion. The fuel tank is typically mounted within the vessel and includes a fuel fill inlet or filler line that extends from the tank to an fill port or access point on the vessel, such as on the deck, and a vent line that extends from the tank to allow for ventilation of the tank to prevent the undesired build-up of vapor pressure.

As noted above, fuel systems used on marine vessels typically include a vent line from the fuel tank. The vent line opens to the atmosphere above the water-line. The vent line permits air to escape from the tank as the tank is being refueled. The vent line also enables air to enter the tank as fuel is withdrawn for delivery to the engine. A significant problem with conventional fuel tank vent lines is the potential for fuel spillage. For example, air flowing out of the vent line can carry fuel overboard and into the water. In addition, wave action can rock the vessel sufficiently to cause fuel to be discharged overboard through the vent line. In addition, thermal expansion can also cause fuel, particularly from a full tank, to be discharged overboard through the vent line. Another significant problem can be encountered during the fueling of marine vessels. More particularly, the spillage of fuel into the environment due to overfilling, whereby fuel escapes through the vent line or fuel fill port, is a persistent environmental issue that has heretofore not been successfully addressed. The problem generally occurs due to the fuel filling attendant's failure to shut-off or terminate fuel flow when the vessel's fuel tank is filled thereby causing fuel to backflow through the fuel fill inlet line and ultimately spill from the vent port and/or fill port.

As a result of these problems, the background art reveals a number of attempts directed to addressing fuel spillage from marine vessels. Those attempts include disclosures directed to capturing spilled fuel by use of spillage containers removably attached to the side of the boat as disclosed in U.S. Pat. Nos. 4,802,125 (Wilson et al.) and 4,802,514 (Morse).

Further advancements include, U.S. Pat. No. 3,187,935, issued to Lense, which discloses a venting device for fuel tanks having a pair of vent pipes that terminate in the tank at opposite ends thereof. Since both ends of the fuel tanks are "vented" the tank is always properly vented regardless of the orientation of the vessel.

U.S. Pat. No. 4,724,861, issued to Covert et al., discloses a fuel tank venting system having a relatively complex mechanical apparatus that functions to inhibit the flow of fuel vapor.

U.S. Pat. No. 5,322,099, issued to Langlois, discloses an apparatus for preventing the spillage of fuel into the water when filling a fuel tank of a marine vessel. A valve assembly installed in the vent line, and an overflow container is disposed in the vent line between the valve assembly and the vent port. The valve assembly includes a drain hole for permitting small quantities of fuel to pass through the valve assembly and into the overflow container. A fill container is used to capture fuel when filling the fuel tank. U.S. Pat. No. 5,515,891, issued to Langlois, discloses an apparatus for preventing fuel spillage that also includes the installation of an overflow container and valve assembly in the vent line. A fill container is used when filling. The fill container includes a float that provides a visual indication when the tank is full. A by-pass line is coupled between the fill container and the overflow container. U.S. Pat. No. 5,950,688, issued to Langlois, discloses another apparatus for preventing fuel spillage when filling a fuel tank on a vessel. In this patent Langlois discloses installation of a fill container (212) to the fuel fill line. A drain or vent line (307) operates to vent gases present in the system as well as preventing the formation of a vacuum.

U.S. Pat. No. 7,380,542, issued to Herrington, discloses a fuel vent tank for marine craft. A collection tank is mounted in the vent line from the main fuel tank. Fuel escaping the main tank through the vent line enters the collection tank. A float switch is connected to a warning light.

The disclosures of the background art generally disclose overly complex systems that are inherently ineffective and/or unreliable. In addition, many of the systems disclosed in the background art rely on check valves to stop the flow of fuel through the vent line. The use of check valves is considered particularly undesirable since mechanical valves are prone to failure, and should the valve become stuck in a closed configuration pressure could quickly rise in the fuel system leading to a potentially catastrophic explosion resulting in loss of life and/or loss of the vessel. Such systems fail to comply with standards set forth by the American Boat and Yacht Council (ABYC) that require fuel tank vent systems not to restrict the continuous release of vapor. Accordingly, there remains a need in the art for advancements in the field of marine fuel filling systems to prevent the environmental contamination due to the unintended spillage of fuel during the fueling process.

BRIEF SUMMARY OF THE INVENTION

The present invention overcomes the limitations and disadvantages in the art by providing a marine fuel backflow preventer and overfill alarm for use with marine vessels. In accordance with the present invention, the fuel backflow preventer includes a housing provided for in-line installation in the fuel fill inlet line. The backflow preventer is adapted to direct fuel entering the fuel filling inlet generally directly to a fuel filling outlet such that the fuel is directed to the vessel fuel tank. The housing further functions as a reservoir for containing fuel which has accumulated therein due to over-filling and/or that has been carried into the housing via the fuel tank vent line. By providing a fuel containing reservoir disposed in-line the present invention thus functions to prevent unintended fuel spillage into the environment.

In accordance with the present invention a backflow preventer housing is provided and adapted for in-line installation in the fuel filling line. The backflow preventer housing comprises a generally water tight enclosure having a top, defining a fuel fill inlet, and a bottom defining a fuel fill outlet. The bottom is preferably concave or sloped toward the fuel fill outlet to allow any fuel finding its way within the housing to drain to the fuel tank under the influence of gravity. The top further defines a pair of vent openings including a first opening for connection to a vent line in fluid communication with the fuel tank, and a second opening for connection to a vent line in communication with the atmosphere. The fuel fill inlet preferably comprises vertically disposed length of pipe having an upper end that projects through the top of the housing, and a lower end that extends within the housing terminating in spaced relation proximal the housing bottom. A second pipe is disposed entirely within the housing and projects upward from the bottom in generally concentric surrounding relation with the lower portion of the fuel fill inlet pipe. The second pipe includes a bottom edge fixed, along a portion thereof, to the housing bottom such that the second pipe is in generally concentric relation with the housing fuel fill outlet, with the bottom edge defining at least one notch that allows any fuel within the housing to drain out of the fuel fill outlet. The configuration of a fuel fill inlet pipe and concentrically disposed internal pipe functions to direct incoming fuel toward the housing fuel fill outlet such that the fuel exits the housing fuel fill outlet on its way to the vessel fuel tank.

An overflow alarm is further provided to provide an alarm, such as the generation of an audible alarm, a visual alarm, or both, should fuel begin to backflow into the housing. In accordance with this aspect of the present invention the housing is provided with an electro-mechanical float switch that automatically activates an alarm upon sensing the presence of fuel within the housing. The alarm provides the fuel filling attendant a prompt warning that an overflow condition is being experienced such that the flow of fuel may be terminated prior to spillage into the environment.

Accordingly, it is an object of the present invention to provide a marine fuel backflow preventer and fill alarm system for use on marine vessels.

Another object of the present invention is to provide a marine fuel backflow preventer that functions without mechanical check valves thereby minimizing potentially hazardous failure events.

Still another object of the present invention is to provide a marine fuel backflow preventer that integrates the fuel tank vent line to allow for venting of the fuel tank through the backflow preventer to the atmosphere.

These and other objects are met by the present invention which will become more apparent from the accompanying drawing and the following detailed description of the drawings and preferred embodiments.

DETAILED DESCRIPTION OF THE INVENTION

Figure 1:
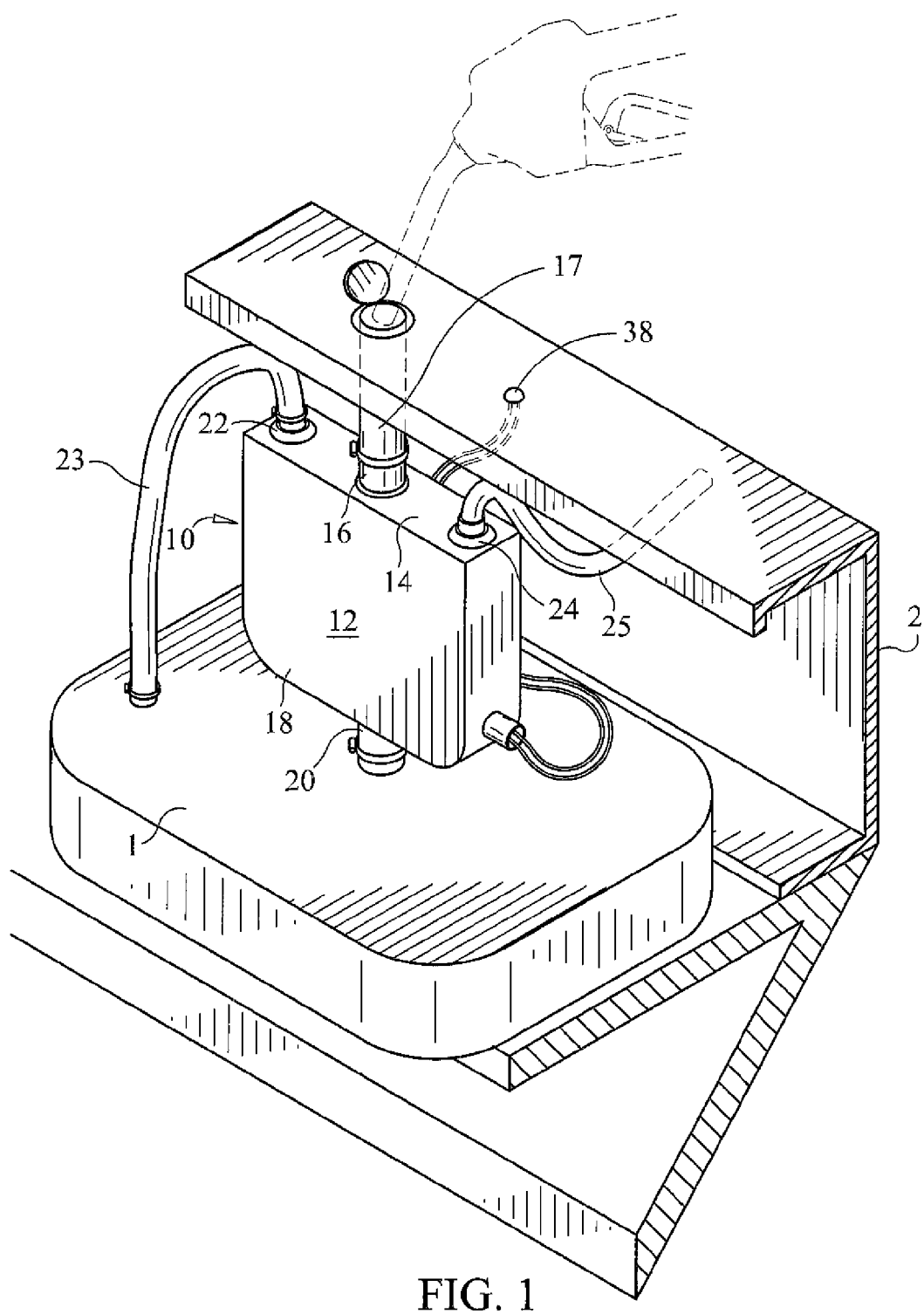
FIG. 1 is a partial perspective view of a marine vessel with a fuel tank adapted with a backflow preventer in accordance with the present invention.
Figure 2:
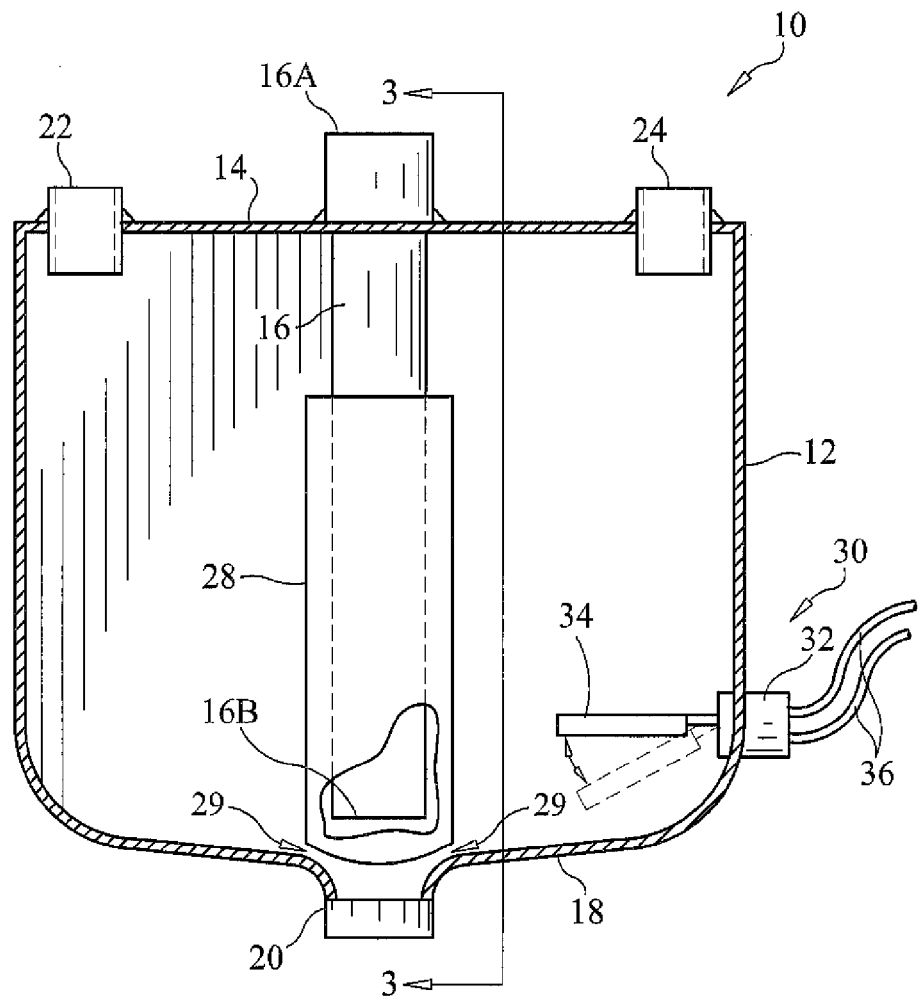
FIG. 2 is a side view of the interior of the backflow preventer.

With reference now to the drawings, FIGS. 1-6, the present invention overcomes the limitations and disadvantages in the art by providing a marine fuel system having an fuel filling line adapted with a fuel backflow preventer, generally referenced as 10, having with an electro-mechanical overfill alarm as generally depicted in FIG. 1. As best illustrated in FIG. 2, fuel backflow preventer 10 includes a housing 12 adapted for in-line installation in the fuel fill inlet line connected to the fuel tank 1 in a marine vessel 2. As more fully discussed herein, housing 12 defines an interior volume and functions as a collection tank and/or overflow reservoir for capturing fuel that may have otherwise overflowed or spilled into the ocean. Housing 12 comprises a generally water tight enclosure having a top 14 defining a fuel fill inlet 16, and a bottom 18 defining a fuel fill outlet 20. Fuel fill inlet 16 and fuel fill outlet 20 are generally axially aligned along a generally vertical axis. The housing bottom 18 is preferably concave or otherwise downwardly sloped from the housing lateral sides toward the fuel fill outlet 20 to allow any fuel within the housing to drain to the fuel tank via outlet 20 under the influence of gravity. Furthermore, fuel fill outlet 20 is preferably characterized as being funnel-shaped to allow for efficient and rapid draining of fuel therethrough. Top 14 further defines a pair of vent ports or openings, including a first vent port 22 for connection to a vent line 23 running from the fuel tank, and a second vent port 24 for connection to a vent line 25 that runs to an overboard thru-hull vent fitting. Housing 12 is preferably fabricated from welded aluminum, or other suitable material.

As best seen in FIG. 2, the fuel fill inlet 16 preferably comprises a pipe received within an annular opening in the housing top 14 and fixed relative to the housing top, such as by welded connection. The pipe preferably includes an upper portion terminating in an upper end 16A that projects upward from the top 14 of housing 12, and a lower portion extending into the housing interior and terminating in a lower end 16B disposed in spaced relation proximal the bottom 18 of housing 12. As illustrated in FIG. 1, the upper end 16A of fuel fill inlet 16 is connected to a fuel fill line that extends to a fuel fill port suitably located on an exterior surface of the vessel.

Figure 3:
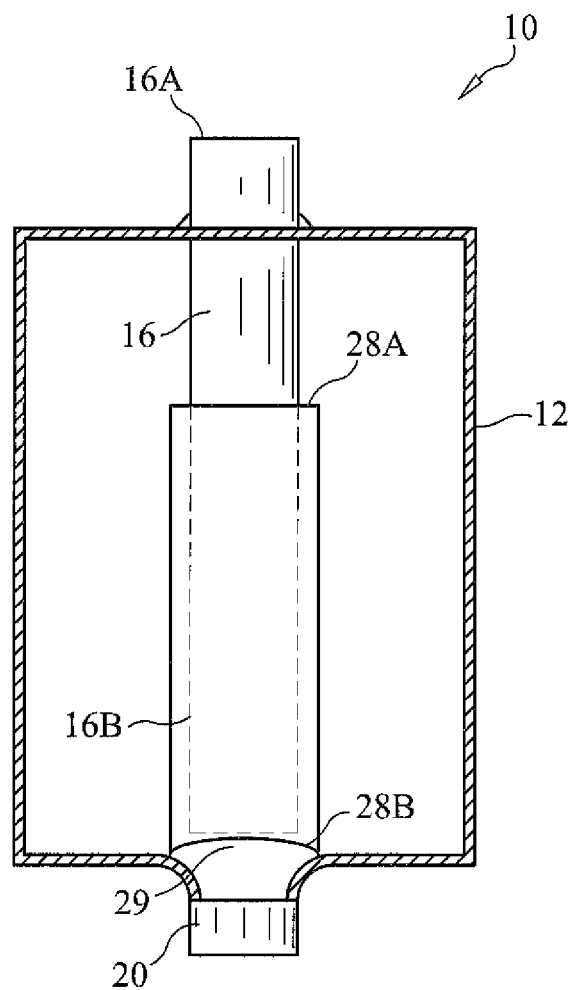
FIG. 3 is a sectional side view of the backflow preventer taken along section line 3-3 of FIG. 2.
Figure 4:
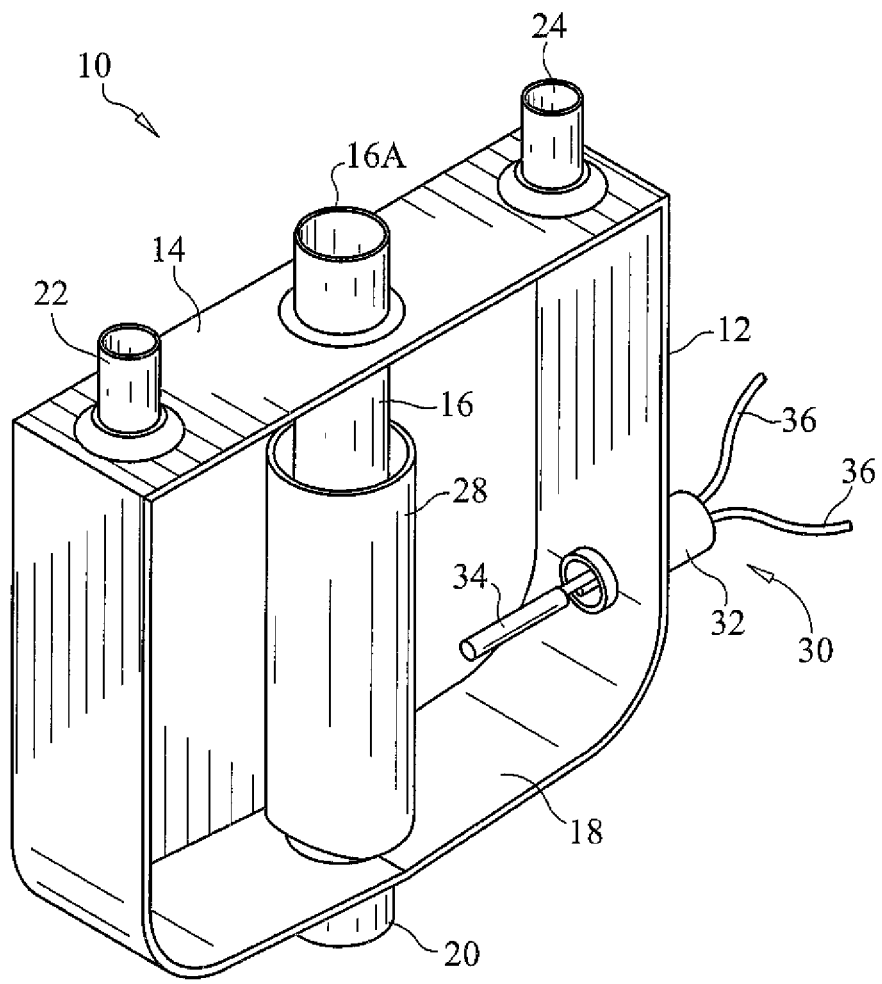
FIG. 4 is a perspective view illustrating the interior of the backflow preventer.

A best illustrated in FIG. 2, housing 12 contains a generally tubular internal baffle 28 disposed therein. Internal baffle 28 includes an upper end 28A and a lower end 28B. Internal baffle 28 projects generally upward from the bottom 18 of housing 12, and is disposed in generally concentric and radially spaced surrounding relation with the lower portion of the fuel fill inlet pipe 16. The lower end 28B of internal baffle 28 defines a bottom edge with a portion thereof fixed to the housing (as by welding) in generally concentric relation with the housing fuel fill outlet 20. The lower end 28B preferably defines at least one notch or opening 29 that allows any fuel within the housing 12 to drain out of the funnel-shaped fuel fill outlet 20 as best seen in FIGS. 2-3. The preferred embodiment depicted in FIGS. 1-4 includes two notches, each referenced as 29. It should be apparent that any suitable number of notches may be used, and the notches may be of any suitable shape or configuration. Notches 29 further contain fuel overflowing from the fuel tank by allowing the fuel to enter housing 12 by back flowing through outlet 20 in an overflow situation. The configuration of a housing 12 with a fuel fill inlet pipe 16 and concentrically disposed internal baffle 28 functions to direct incoming fuel toward the housing fuel fill outlet 20 during refueling such that the fuel exits the housing fuel fill outlet on its way to the vessel fuel tank.

Housing 12 further includes an overflow alarm system, generally referenced as 30, that functions to provide a warning, such as the generation of an audible alarm, a visual alarm, or both, should fuel begin to backflow into housing 12. In accordance with this aspect of the present invention housing 12 is provided with an electro-mechanical float switch 32 having a pivotally connected buoyant actuator 34 disposed in proximity to the bottom 18 of housing 12. Electrical conductors 36 run from float switch 32 to an alarm generating device 38, such as a horn, light, becon, or any other suitable alarm device. Overflow alarm system 30 automatically activates an alarm upon sensing the presence of fuel, namely a rising fuel level sufficient to trigger float switch 32, within the housing. The alarm provides the fuel filling attendant a prompt warning that an overflow condition is being experienced such that the flow of fuel may be terminated prior to spillage into the environment.

Figure 5:
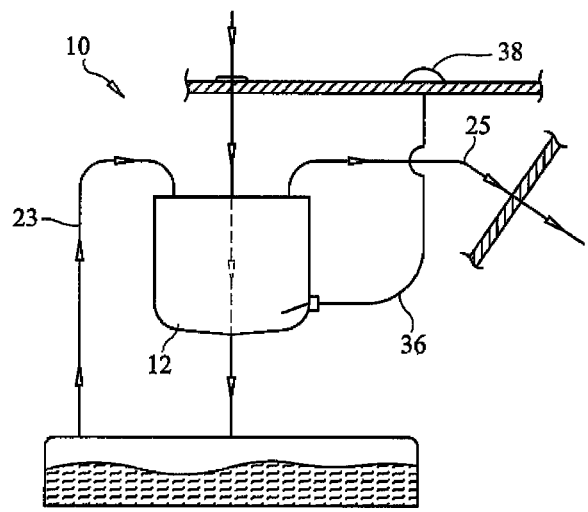
FIG. 5 is a schematic illustration of the fuel filling operation in a vessel adapted with a backflow preventer in accordance with the present invention.
Figure 6:
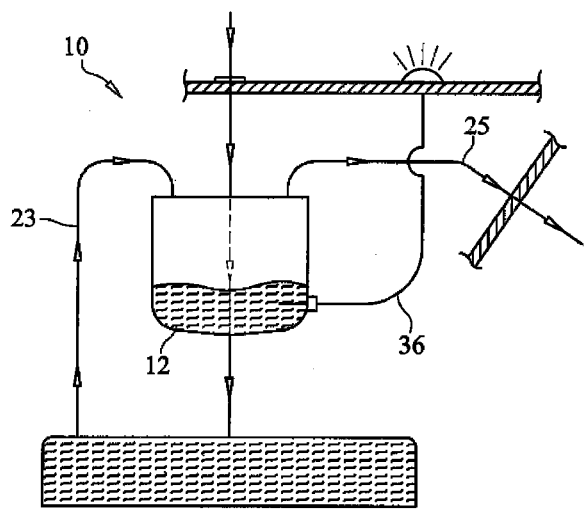
FIG. 6 is a schematic illustration thereof with fuel flowing into the backflow preventer in an overfill situation.

FIGS. 5 and 6 provide schematic illustrations of a re-fueling operation for a marine vessel adapted with a backflow preventer and overfill alarm in accordance with the present invention. FIG. 5 illustrates a re-fueling operation wherein fuel is pumped through housing 12 into a partially filled fuel tank. As fuel enters the tank, fuel vapors exit the tank via line 23 whereafter the vapors pass through housing 12 and exit the vessel via vent line 25. FIG. 6 illustrates a re-fueling operation wherein the fuel tank is full and a continuing flow of fuel has begun to backflow into housing 12 whereby the rising fuel level actuates buoyant actuator 34 thereby generating an alarm via alarm generating device 38, such as a beacon.

As should now be apparent the present invention provides advancements in the art of marine fueling by providing a backflow preventer with an overfill alarm that prevents fuel spillage from the fuel tank vent line, and provides the fueling attendant with a warning system to provide an alert when the tank is full.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A marine fuel backflow preventer and overfill alarm system for preventing the escape of fuel from a marine vessel having a fuel tank, a fuel filling port in communication with the fuel tank, and a vent line running from the fuel tank to an overboard vent fitting, said system comprising:

a housing defining an interior volume, said housing including a top and a bottom;

said housing top including a fuel fill inlet coupled in fluid communication with the fuel filling port;

said housing bottom including a fuel fill outlet coupled in fluid communication with the fuel tank;

a pipe having an upper end in fluid communication with said fuel fill inlet and a lower end projecting into said housing interior volume;

a generally cylindrical internal baffle disposed within said housing, said baffle having a lower end connected to the bottom of said housing in concentric relation with said fuel fill outlet, and an upper end disposed in generally concentric and radially spaced surrounding relation with the lower end of said fuel fill inlet pipe, said baffle lower end including at least one notch; and said housing top including a first vent port coupled in fluid communication with the fuel tank by a first vent line, and a second vent port coupled in fluid communication with the overboard vent fitting by a second vent line.

2. A system according to claim 1, wherein said housing bottom slopes downwardly to said fuel fill outlet.

3. A system according to claim 1, wherein said fuel fill inlet and said fuel fill outlet are axially aligned.

4. A system according to claim 1, further including an overflow alarm configured to generate an alarm when liquid fuel within said housing reaches a predetermined level.

5. A marine fuel backflow preventer and overfill alarm system for preventing the escape of fuel from a marine vessel having a fuel tank, a fuel filling port in communication with the fuel tank, and a vent line running from the fuel tank to an overboard vent fitting, said system comprising:

a housing defining an interior volume, said housing including a top and a bottom;

said housing top including a fuel fill inlet coupled in fluid communication with the fuel filling port;

said fuel fill inlet including an open ended pipe having an upper portion projecting upward from said housing top and terminating in an upper end, and a lower potion extending generally vertically downward into said interior volume and terminating in a lower end disposed in spaced relation the bottom of said housing;

said housing bottom sloping downward to a fuel fill outlet coupled in fluid communication with the fuel tank;

said fuel fill outlet disposed in generally axial alignment with said fuel fill inlet;

a generally tubular internal baffle within said housing, said baffle having lower end with at least a portion thereof fixed to the bottom of said housing and an upper end disposed in generally surrounding concentric relation with a portion of the lower portion of said fuel fill inlet pipe;

said internal baffle lower end defining at least one notch for allowing fuel to flow from said housing interior to said fuel fill outlet;

said housing top including a first vent port coupled in fluid communication with the fuel tank by a first vent line, and a second vent port coupled in fluid communication with the overboard vent fitting by a second vent line; and said housing further including an overflow alarm configured to generate an alarm when liquid fuel within said housing reaches a predetermined level.

6. A system according to claim 5, wherein said overflow alarm includes a float switch electrically connected to an alarm, said float switch including a buoyant actuator disposed within the interior volume of said housing in spaced relation with said housing bottom.

* * * * *